United States Patent
Hill

(10) Patent No.: US 10,692,279 B2
(45) Date of Patent: Jun. 23, 2020

(54) SYSTEMS AND METHODS FOR FACILITATING MAKING PARTIAL SELECTIONS OF MULTIDIMENSIONAL INFORMATION WHILE MAINTAINING A MULTIDIMENSIONAL STRUCTURE

(71) Applicant: Quantum Spatial, Inc., St. Petersburg, FL (US)

(72) Inventor: Seth Hill, Portland, OR (US)

(73) Assignee: Quantum Spatial, Inc., St. Petersburg, FL (US)

(*) Notice: Subject to any disclaimer, the term of this patent is extended or adjusted under 35 U.S.C. 154(b) by 43 days.

(21) Appl. No.: 16/042,940

(22) Filed: Jul. 23, 2018

(65) Prior Publication Data
US 2019/0035145 A1 Jan. 31, 2019

Related U.S. Application Data

(60) Provisional application No. 62/539,266, filed on Jul. 31, 2017.

(51) Int. Cl.
*H04L 29/08* (2006.01)
*G06T 17/05* (2011.01)
*G01S 17/89* (2020.01)

(52) U.S. Cl.
CPC .............. *G06T 17/05* (2013.01); *G01S 17/89* (2013.01); *H04L 67/04* (2013.01);
(Continued)

(58) Field of Classification Search
CPC ......... H04L 67/00; H04L 67/04; H04L 67/12; H04L 67/28; H04L 67/2823;
(Continued)

(56) References Cited

U.S. PATENT DOCUMENTS

| | | | | |
|---|---|---|---|---|
| 4,660,157 A | * | 4/1987 | Beckwith | G09B 9/301 |
| | | | | 345/421 |
| 6,295,624 B1 | * | 9/2001 | Gillard | H04N 19/619 |
| | | | | 714/746 |

(Continued)

OTHER PUBLICATIONS

Shuffle—Definition of Shuffle by Merriam-Webster—Feb. 11, 2016.*
(Continued)

*Primary Examiner* — Michael A Keller
*Assistant Examiner* — Boris D Grijalva Lobos
(74) *Attorney, Agent, or Firm* — FisherBroyles, LLP

(57) ABSTRACT

Various embodiments are directed to making partial selections of multidimensional information while maintaining a multidimensional structure. A server computing device may receive multidimensional data describing a structure of a physical object from one or more sources. The server computing device may then determine a data subset representative of the multidimensional data describing the structure of the physical object. The server computing device may then store the data subset on a storage device. Finally, the server computing device may send the data subset to a client computing device for displaying the structure of the physical object. The data subset may enable the client computing device to utilize fewer hardware computing processing, memory, and bandwidth resources to display the structure of the physical object than are associated with displaying the physical object using the multidimensional data. The client computing device may be incapable of displaying the multidimensional data.

14 Claims, 3 Drawing Sheets

(52) U.S. Cl.
CPC ...... *H04L 67/2823* (2013.01); *H04L 67/2828* (2013.01); *G06T 2215/16* (2013.01)

(58) Field of Classification Search
CPC ... H04L 67/2828; H04L 67/2842; G06F 3/00; G06F 3/14; G06F 15/00; G06F 15/16; G06F 17/00; G06F 17/50; G06T 11/00; G06T 15/00; G06T 15/005; G06T 17/00–30; G06T 19/00; G06T 19/20; G06S 7/00; G06S 7/04; G06S 7/046; G01S 17/00–88
See application file for complete search history.

(56) References Cited

U.S. PATENT DOCUMENTS

| | | | | |
|---|---|---|---|---|
| 7,065,212 | B1* | 6/2006 | Yu | G06T 1/0028 375/E7.029 |
| 8,390,623 | B1* | 3/2013 | Guskov | G06T 17/20 345/419 |
| 8,797,337 | B1* | 8/2014 | Labour | G06F 21/53 345/522 |
| 9,875,526 | B1* | 1/2018 | Weinstock | G06T 3/60 |
| 2004/0054878 | A1* | 3/2004 | Debes | G06F 9/30014 712/221 |
| 2005/0141757 | A1* | 6/2005 | Ayache | G06T 7/0012 382/128 |
| 2005/0285879 | A1* | 12/2005 | Suzuki | G06T 19/006 345/633 |
| 2009/0263001 | A1* | 10/2009 | Ding | G06T 5/002 382/131 |
| 2011/0169913 | A1* | 7/2011 | Karaoguz | G06F 3/14 348/42 |
| 2012/0004854 | A1* | 1/2012 | Fernandez | G01N 33/57449 702/19 |
| 2012/0162057 | A1* | 6/2012 | Tan | G06F 3/011 345/156 |
| 2013/0060540 | A1* | 3/2013 | Frahm | G06T 15/06 703/2 |
| 2016/0112528 | A1* | 4/2016 | Chen | H04L 67/10 709/203 |
| 2017/0041587 | A1* | 2/2017 | Wei | B64C 39/024 |
| 2017/0206660 | A1* | 7/2017 | Trail | G06T 7/521 |

OTHER PUBLICATIONS

Arvo, Stratified Sampling of 2-Manifolds, State of the Art in Monte Carlo Ray Tracing for Realistic Image Synthesis, SIGGRAPH, Aug. 2001, Course Notes, vol. 29.
Bacher et al., MergeShuffle: A Very Fast, Parallel Random Permutation Algorithm, arXiv.org, Aug. 14, 2015.
Wikipedia, Fisher-Yates shuffle, https://en.wikipedia.org/wiki/Fisher%E2%80%93Yates_shuff, as accessed on Jul. 19, 2018.
Wikipedia, Insensitivity to sample size, https://en.wikipedia.org/wiki/Insensitivity_to_sample_size, as accessed on Jul. 19, 2018.

* cited by examiner

SYSTEMS AND METHODS FOR FACILITATING MAKING PARTIAL SELECTIONS OF MULTIDIMENSIONAL INFORMATION WHILE MAINTAINING A MULTIDIMENSIONAL STRUCTURE

CROSS-REFERENCE TO RELATED APPLICATIONS

This patent application claims priority to U.S. Patent Application Ser. No. 62/539,266, filed Jul. 31, 2017 and entitled "Systems and Methods for Facilitating Making Partial Selections of Multidimensional Information while maintaining a Multidimensional Structure," of which the disclosure is incorporated herein, in its entirety, by reference.

BACKGROUND

Data processing operations, such as those used in ground and/or aerial surveys, may generate data sets that represent objects in a multidimensional (e.g., three dimensional) space. For example, a survey may utilize aerial scanning Light Detection and Ranging (LiDAR) techniques to capture high resolution scans of a building or pipeline. These scans may then be processed by multiple servers to generate representative three-dimensional data sets. However, the multidimensional data sets generated by traditional processing operations are extremely large (e.g., on the order of millions or billions of data points) and typically require enormous computing resources to manage. As a result, client devices (including mobile devices) tasked with utilizing these data sets typically do not have enough processing, memory, or other computing resources sufficient to receive and/or store multidimensional data. It is with respect to these considerations and others that the various embodiments of the present invention have been made.

SUMMARY

As will be described in greater detail below, the instant disclosure describes various systems and methods for facilitating making partial selections of multidimensional information while maintaining a multidimensional structure.

In one example, a system may include at least one processor and at least one memory storing computer-executable instructions. The computer-executable instructions, when executed by the at least one processor, may cause the system to (1) receive, by a server computing device, multidimensional data describing a structure of a physical object from one or more sources, (2) determine, by the server computing device, a data subset representative of the multidimensional data describing the structure of the physical object, (3) store, by the server computing device, the data subset on a storage device, and (4) send, by the server computing device, the data subset to a client computing device for displaying the structure of the physical object.

In some examples, the data subset may enable the client computing device to utilize fewer hardware computing processing, memory, and bandwidth to display the structure of the physical object than are associated with displaying the physical object using the multidimensional data. In some examples, the client computing device may be incapable of displaying the multidimensional data.

In some examples, the multidimensional data may be received as multiple separate data sets. In some examples, the data subset may be determined by randomizing the multidimensional data to generate sample data that is smaller in size than the multidimensional data. In one example, randomizing the multidimensional data may include removing a temporal and/or a computational bias present in the multidimensional data.

In some examples, the multidimensional data may include image data representing the physical object in three-dimensions. In some examples, a source of the multidimensional data may include a Light Detection and Ranging (LiDAR) data source. In some examples, the data subset may be stored as a file on the storage device and the storage device may include one or more cloud storage devices.

In some examples, the data subset may be sent in response to a request by the client computing device to receive a partial selection of the multidimensional data. In some examples, the data subset maintains an original structure of the physical object.

In one embodiment, a computer-implemented method for making partial selections of multidimensional information while maintaining a multidimensional structure may include (1) receiving, by a server computing device, multidimensional data describing a structure of a physical object from one or more sources, (2) determining, by the server computing device, a data subset representative of the multidimensional data describing the structure of the physical object, (3) storing, by the server computing device, the data subset on a storage device, and (4) sending, by the server computing device, the data subset to a client computing device for displaying the structure of the physical object.

In some examples, the data subset may enable the client computing device to utilize fewer hardware computing processing, memory, and bandwidth to display the structure of the physical object than are associated with displaying the physical object using the multidimensional data. In some examples, the client computing device may be incapable of displaying the multidimensional data.

In some examples, the multidimensional data may be received as multiple separate data sets. In some examples, the data subset may be determined by randomizing the multidimensional data to generate sample data that is smaller in size than the multidimensional data. In one example, randomizing the multidimensional data may include removing a temporal bias and/or a computational bias present in the multidimensional data.

In some examples, the multidimensional data may include image data representing the physical object in three-dimensions. In some examples, a source of the multidimensional data may include a Light Detection and Ranging (LiDAR) data source. In some examples, the data subset may be stored as a file on the storage device and the storage device may include one or more cloud storage devices.

In some examples, the data subset may be sent in response to a request by the client computing device to receive a partial selection of the multidimensional data. In some examples, the data subset maintains an original structure of the physical object.

In some examples, the above-described method may be encoded as computer-readable instructions on a non-transitory computer-readable medium. For example, a computer-readable medium may include one or more computer-executable instructions that, when executed by at least one processor of a server computing device, may cause the server computing device to (1) receive, by the server computing device, multidimensional data describing a structure of a physical object from one or more sources, (2) determine, by the server computing device, a data subset representative of the multidimensional data describing the structure of the physical object, (3) store, by the server computing device, the data subset on a storage device, and (4) send, by the server computing device, the data subset to a client computing device for displaying the structure of the physical object.

In some examples, the data subset may enable the client computing device to utilize fewer hardware computing processing, memory, and bandwidth to display the structure of the physical object than are associated with displaying the physical object using the multidimensional data. In some examples, the client computing device may be incapable of displaying the multidimensional data.

In some examples, the multidimensional data may be received as multiple separate data sets. In some examples, the data subset may be determined by randomizing the multidimensional data to generate sample data that is smaller in size than the multidimensional data. In one example, randomizing the multidimensional data may include removing a temporal bias and/or a computational bias present in the multidimensional data.

In some examples, the multidimensional data may include image data representing the physical object in three-dimensions. In some examples, a source of the multidimensional data may include a Light Detection and Ranging (LiDAR) data source. In some examples, the data subset may be stored as a file on the storage device and the storage device may include one or more cloud storage devices.

In some examples, the data subset may be sent in response to a request by the client computing device to receive a partial selection of the multidimensional data. In some examples, the data subset maintains an original structure of the physical object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

Figure 1:
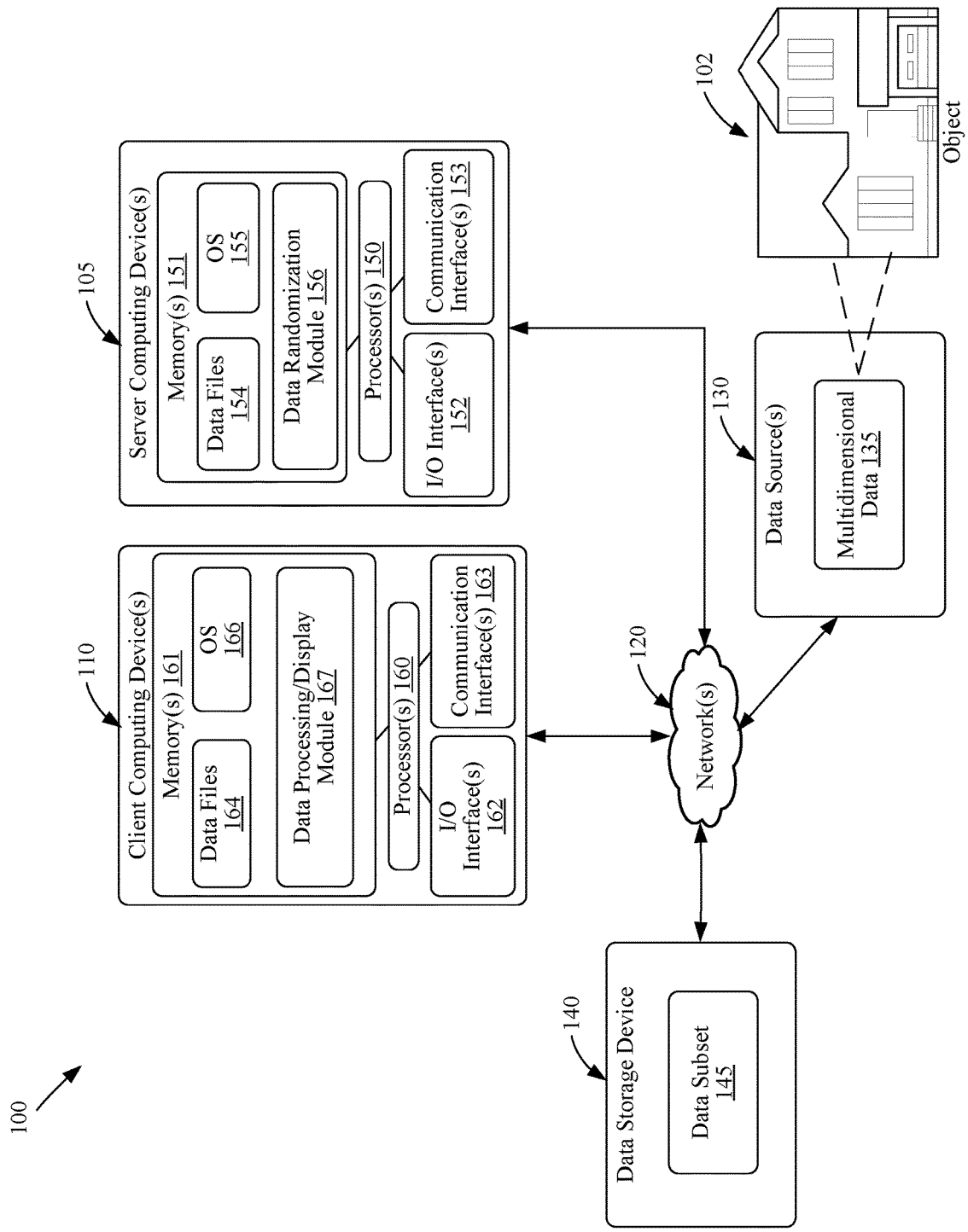
FIG. 1 illustrates a block diagram of an example system for facilitating making partial selections of multidimensional information while maintaining a multidimensional structure, according to an example embodiment.

Various embodiments of the disclosure are directed to systems and methods for facilitating making partial selections of multidimensional information while maintaining a multidimensional structure. According to an aspect of the disclosure, a server computing device may receive multidimensional data describing a structure of an object from one or more sources. The server computing device may then determine a data subset representative of the multidimensional data. The data subset may include a randomized sample of the multidimensional data describing the structure of the object. The server computing device may then store the data subset on a storage device. Finally, the server computing device may send the data subset to a client computing device for displaying the structure of the object.

In some embodiments, the multidimensional data may include a two or three-dimensional image data file collected from multiple sources (e.g., LIDAR sensor data, image-derived point cloud data, thermal imaging data, etc.). The server computing device may include one or more servers in a distributed (e.g., cloud-based) computing system. The data subset representative of the multidimensional data may be determined by randomizing the received multidimensional data. The multidimensional data may be randomized by applying a randomization algorithm (e.g., a Fisher Yates shuffle algorithm) to the multidimensional data. The determined data subset may include sample data which is smaller in size than the initially received multidimensional data. The data subset may be stored as a single file on a storage device within a distributed (e.g., cloud-based) computing system. The data subset including the randomized multidimensional data may be sent to a mobile computing device for the processing and displaying three-dimensional image data.

The embodiments of the disclosure may further include the collection of large amounts of three-dimensional data. This data may contain spatial information, but this information is biased by the physical act of recording it to a storage device (e.g., a disk). Because the entire data set is typically not collected simultaneously, data points may spatially cluster. Even computed datasets (such as those based on three-dimensional photogrammetry) may be biased by the content of the source two dimensional images. After the initial data collection, the three-dimensional data may be transformed using a distributed randomization system. This transformation removes temporal and computational bias, as well as any other unanticipated biases, from the data. The unbiased data may then be stored and made available on an information system. When a client computing system requires a partial selection of the data, the information system returns the data in the unbiased order. The client computing system receives data with no temporal or computational bias, and no statistical selection bias. Removing the selection bias reduces the chance of over or under estimation, enables proper statistical analysis of the entire data set, mitigates assumptions of false positives and false negatives based on human observation of the data. Because each data point has been randomly ordered, each additional point adds spatial information to the dataset that the client computing has received (consequence of temporal clustering). The client computing system may use this to make partial selections that accurately represent a three-dimensional object described by the data according to the client computing system's processing constraints (e.g., available memory, etc.).

The embodiments of the disclosure described herein provide several advantages over traditional methods of processing, storing, and communicating large amounts of multidimensional data (e.g., three-dimensional data) in a computer system. Traditional methods may use an indexing method, where one of several tree data structures are used to implement spatial indexing techniques. In these traditional methods, a selection is made in the index which then is used to locate the actual data on disk. Thus, traditional methods rely on duplicating data (thus creating storage overhead). Traditional methods also fail to maintain consistent spatial resolution or a multidimensional (e.g., three-dimensional) structure for partial selections of data. Moreover, the implementation of the aforementioned traditional methods is limited to using high-end hardware (e.g., expensive computing systems with large storage capacities) for carrying out processing operations.

The embodiments described herein enable the processing, storing, and communicating large amounts of multidimensional data (e.g., three-dimensional data) in a computer system by pre-processing the data thereby allowing low-latency access to the data at any resolution (up to the maximum resolution of the data) while maintaining spatial resolution and multidimensional structure. Advantages over traditional methods include eliminating processing costs associated with a server in delivering the data to other computing systems (thereby enabling the use of lower-cost systems to store the data), enabling client computing devices to process datasets many times larger than it is capable of storing, enabling client computing devices to process any subset of the data (each of the data subsets may be random samples), increasing resolution when viewing the data on client computing devices by fetching additional data without duplicating previously viewed data, and enabling the division of a multidimensional data subset on client computing devices into further data subsets for processing. The further data subsets may also be randomly selected such that the processing steps may be repeated on the multidimensional data subset but in a different order, thus enabling testing against a bias. Thus, the embodiments described herein improve the functioning of computing devices as well as the technical field of multidimensional data processing by reducing system resources (e.g., processor, memory, bandwidth, etc.) needed for communicating multidimensional data in a computer system so that they may be consumed by client computing devices having limited processing, storage and/or bandwidth capabilities.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

System Overview

FIG. 1 represents a block diagram of an example system 100 facilitating making partial selections of multidimensional information while maintaining a multidimensional structure. As shown in FIG. 1, the system 100 may include at least one server computing device 105, one or more client computing devices 115, one or more data sources 130, and a data storage device 140. As desired, one or more suitable networks 120 may facilitate communication between various components of the system 100.

With reference to FIG. 1, the server computing device 105 may receive multidimensional data 135 describing a structure of an object (such as the object 102) from the data source 130. For example, the multidimensional data 135 may include three-dimensional image data of a building, land mass, powerlines, or pipelines obtained from an aerial survey conducted using laser scanning techniques (e.g., LiDAR). As desired, the server computing device 105 may include any number of processor-driven devices or systems, including but not limited to, cloud-based or dedicated application servers, a mobile computer, an application-specific circuit, a minicomputer, a microcontroller and/or any other processor-driven devices or systems configured to run certain software applications for receiving and processing large amounts of data. The server computing device 105 may utilize one or more processors 150 to execute computer-readable instructions that facilitate the general operation of the server computing device 105 and (as will be described in greater detail below) the processing of multidimensional data 135 received from the data source 130.

In addition to having one or more processors 150, the server computing device 105 may further include and/or be associated with one or more memory devices 151, input/output ("I/O") interface(s) 152, and/or communication and/or network interface(s) 153. The memory 151 may be any computer-readable medium, coupled to the processor(s) 150, such as random access memory ("RAM"), read-only memory ("ROM"), and/or a removable storage device. The memory 151 may store a wide variety of data files 154 and/or various program modules, such as an operating system ("OS") 155 and data randomization module 156.

The data files 154 may include any suitable data that facilitates the operation of the server computing device 105 and/or interaction of the server computing device 105 with one or more other components of the system 100. For example, the data files 154 may include information associated with invoking the data randomization module 156 and/or information that facilitates the output of information to a recipient system (e.g., client computing device 110 and/or data storage device 140).

The OS 155 may be suitable module that facilitates the general operation of the server computing device 105, as well as the execution of other program modules. For example, the OS 155 may be, but is not limited to, Microsoft Windows®, Apple OSX™, UNIX, LINUX, a mainframe computer operating system (e.g., IBM z/OS, MVS, OS/390, etc.), or a specially designed operating system.

The data randomization module 156 may include one or more suitable hardware modules, software modules and/or applications configured to facilitate obtaining the multidimensional data 135 describing the object 102 from the data source 130. Additionally, the data randomization module 156 may be configured to determine a data subset 145 representative of the multidimensional data. Additionally, the data randomization module 156 may be configured to store the data subset 145 on the data storage device 140. Additionally, the data randomization module 156 may be configured to send the data subset 145 to the client computing device 110 for displaying the structure of the object 102. A few examples of the operations that may be performed by the data randomization module 156 and/or the server computing device 105 are described in greater detail below with reference to FIGS. 2-3.

The network(s) 120 may include any telecommunication or computer network (e.g., an intranet, a wide area network, a local area network, a personal area network, the Internet, a cellular or mobile network, etc.) that may be utilized to facilitate communication between the server computing device 105, the client computing device 110, the data source 130, and/or the data storage device 140.

The one or more I/O interfaces 152 may facilitate communication between the server computing device 105 and one or more input/output devices; for example, one or more user interface devices, such as a display, a keypad, a touch screen display, a microphone, a speaker, etc., that facilitate user interaction with the server computing device 105. The one or more network and/or communication interfaces 153 may facilitate connection of the server computing device 105 to one or more suitable networks, for example, the network 120. In this regard, the server computing device 105 may receive and/or communicate information to other components of the system 100 (such as the client computing device 110, the data source 130, and/or the data storage device 140.

With continued reference to FIG. 1, any number of client computing devices 110 may be provided. The client computing device 110 may include, but is not limited to, a mobile device (e.g., a mobile phone, Personal Digital Assistants (PDAs), smartphone, tablet computing device, etc.), a desktop computing device, a laptop computing device, servers, multimedia players, embedded systems, wearable devices (e.g., smart watches, smart glasses), virtual reality (VR) or augmented reality (AR) systems, gaming consoles, combinations of one or more of the same, or any other suitable computing device.

In an embodiment, the client computing device 110 may be configured to utilize data processing/display module 167 to receive the data subset 145, including randomized multidimensional data representing the structure of the object 102, from the data storage device 140. As will be described in greater detail below the randomized multidimensional data may include randomly sampled data representing the object 102 utilizing fewer data points than data points included in the multidimensional data 135. The data processing/display module 167 may use the randomly sampled data to make partial selections that accurately represent the object 102 described by the multidimensional data 135 in a multidimensional (e.g., three-dimensional) space in accordance with processing, bandwidth, and/or memory constraints associated with the client computing device 110. The partial selections may then be displayed for viewing (e.g., in a web browser) on the client computing device 110.

In addition to having one or more processors 160, the client computing device 110 may further include and/or be associated with one or more memory devices 161, input/output ("I/O") interface(s) 162, and/or communication and/or network interface(s) 163. The memory 161 may be any computer-readable medium, coupled to the processor(s) 160, such as random access memory ("RAM"), read-only memory ("ROM"), and/or a removable storage device. The memory 161 may store a wide variety of data files 164 and/or various program modules, such as an operating system ("OS") 166, and the data processing/display module 167.

The data files 164 may include any suitable data that facilitates the operation of the client computing device 110 and/or interaction of the client computing device 110 with one or more other components of the system 100. For example, the data files 164 may include information associated with accessing invoking the data processing/display module 167 to receive and display the data subset 145 from the data storage device 140.

The OS 166 may be suitable module that facilitates the general operation of the client computing device 110 as well as the execution of other program modules. For example, the OS 166 may be, but is not limited to, a suitable mobile OS or a specially designed operating system. As desired, the client computing device 110 may additionally include one or more communication modules that facilitate interaction with other computing devices and/or other communications functionality. For example, a suitable near field communication module, radio frequency module, Bluetooth module, or other suitable communication module may be included in client computing device 110.

As discussed above, the data processing/display module 167 may include one or more suitable software modules and/or applications configured to facilitate processing and displaying the data subset 145. For example, the data processing/display module 167 may be configured to display randomized data in the data subset 145 as a three-dimensional image of the object 102 in a web browser on a display screen of the client computing device 110. The display of the randomized data may represent a partial selection (e.g., a subset of the multidimensional data 135) that accurately represents a three-dimensional object while maintaining the original structure of the object and in accordance with available memory, processing, and bandwidth constraints associated with the client computing device 110.

With continued reference to the client computing device 110, the one or more I/O interfaces 162 may facilitate communication between the client computing device 110 and one or more input/output devices; for example, one or more user interface devices, such as a display, a keypad, a mouse, a pointing device, a control panel, a touch screen display, a remote control, a microphone, a speaker, etc., that facilitate user interaction with the client computing device 110. The one or more network and/or communication interfaces 163 may facilitate connection of the client computing device 110 to one or more suitable networks and/or communication links. In this regard, the client computing device 110 may receive and/or communicate information to other components of the system 100, such as the server computing device 105, the data source 130, the data storage device 140, and/or other devices and/or systems.

The data source 130, in some embodiments, may include multiple data sources configured to store the multidimensional data 135. For example, one data source in the data source 130 may store LiDAR sensor data associated with an object. Another data source in the data source 130 may store image-derived point cloud data (e.g., photographs of an object taken from different angles and computed positions of the object in three-dimensional space). As defined herein a "point cloud" may include a set of data points in a three-dimensional coordinate system that are intended to represent the external surface of an object. Another data source in the data source 130 may store data scans associated with an object. The data source 130 may also be other data sources configured to store other types of data in accordance with the embodiments described herein.

The data storage device 140, in some embodiments, may include a distributed storage system to store the data subset 145. For example, the data storage device 140 may include multiple different servers, hard drives, and/or cloud storage systems.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Figure 2:
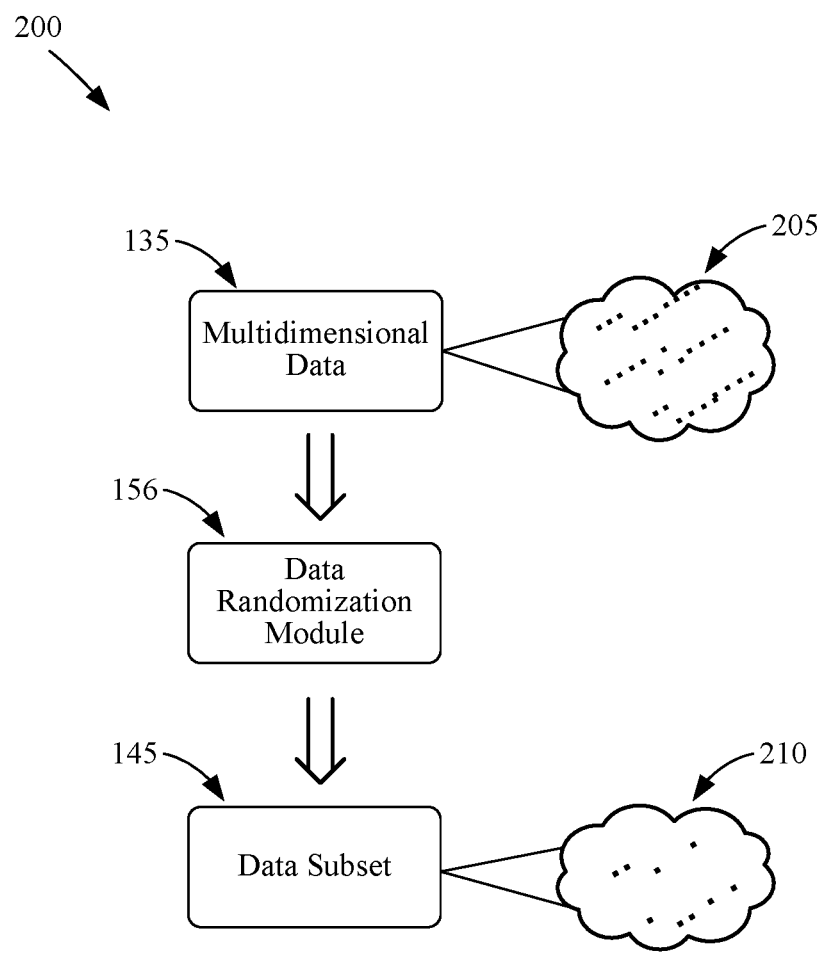
FIG. 2 illustrates a block diagram of a server computing device for facilitating making partial selections of multidimensional information while maintaining a multidimensional structure, according to an example embodiment.

FIG. 2 illustrates a block diagram 200 of the data randomization module 156 on the server computing device 105 being utilized to determine the data subset 145 from the multidimensional data 135, according to an example embodiment. Turning now to FIG. 2, the data randomization module 156 may receive the multidimensional data 135 previously received from the data source 130 by the server computing device 105. In some embodiments, the multidimensional data 135 may include a large number of data points 205 describing the structure of a three-dimensional object such as the object 102. As defined herein, an "object"

may include a single physical object (e.g., a building, a vehicle, etc.), a collection of multiple objects within a predetermined area (e.g., utility power lines, oil or natural gas pipelines, etc.), a space within a structure (e.g., a room), and/or a land mass upon which multiple objects may reside. In some embodiments, the data points 205 may be on the order of millions or billions of data points utilized to accurately represent the object 102 in a multidimensional space.

In some embodiments, the data randomization module 156 may randomize the multidimensional data 135 utilizing a suitable statistical algorithm such as a shuffle algorithm. One example of a suitable shuffle algorithm is the Fisher-Yates algorithm (or Fisher-Yates shuffle). The Fisher-Yates algorithm is an unbiased randomization algorithm. The Fisher-Yates algorithm may be utilized to generate a random permutation of a finite sequence—in plain terms, the algorithm shuffles the sequence. The algorithm may effectively put all of a group of elements into a figurative "hat." The algorithm may then continually determine the next element by randomly drawing an element from the hat until no elements remain. The algorithm may produce an unbiased permutation making every permutation equally likely. The algorithm may also take an amount of time proportional to the number of elements being shuffled and shuffle them in place, thus making execution very efficient.

In randomizing the multidimensional data 135, the data randomization module 156 may execute the algorithm to "shuffle" the data points 205 and then randomly draw (or sample) a data subset (e.g., the data subset 145) including a smaller number of randomized data points 210. Due to the unbiased nature of the randomization and given the large number of initial data points 205, the resulting data subset 145 generated by the data randomization module 156 has a very high likelihood of accurately describing the object 102 using the randomized data points 210. In utilizing the data randomization module 156 to randomize data, a uniform distribution (e.g., a rectangular distribution) of the data may be produced where all outcomes are equally likely and where there is no bias between them.

As defined herein, a "bias" may include a statistical measure or attribute calculated in such a way that it is systematically different from the population parameter being estimated. As discussed above, multidimensional data containing spatial information may be biased by the physical act of recording the information to a storage device (e.g., a disk) over multiple time periods. As a result, because the entire data set is not collected simultaneously, data points may spatially cluster leading to inaccuracies in an object (or objects) being described by the data set. However, due to the unbiased nature of the randomization performed by the data randomization module 156 when applied to uniform data, each data point that is read is a "simple random sample." Thus, when statistical operations are performed on a data subset (e.g., an average calculation), the operations follow a normal distribution (e.g., by the central limit theorem), and the "accuracy" varies inversely with the square root of the sample size. Therefore, the more data that is read or processed by the data randomization module 156, the greater the accuracy of the randomized or sample data.

Thus, in some examples, the randomized data points 210 in the data subset 145 may include only thousands of data points (instead of the millions or billions of data points 205 in the multidimensional data 135. For example, the multidimensional data 135 may include millions of pixels (e.g., data points) describing a high resolution three-dimensional image of a room in a building having a door, four walls, and a window. After utilizing the data randomization module 156, the data subset 145 may include thousands of data points describing the room in which the three-dimensional image of the room is reformed (e.g., at a lower resolution) with all its features (e.g., the door, the walls, and the window) being represented. Thus, the multidimensional structure of the object 102 is maintained within the data subset 145.

Operational Overview

Figure 3:
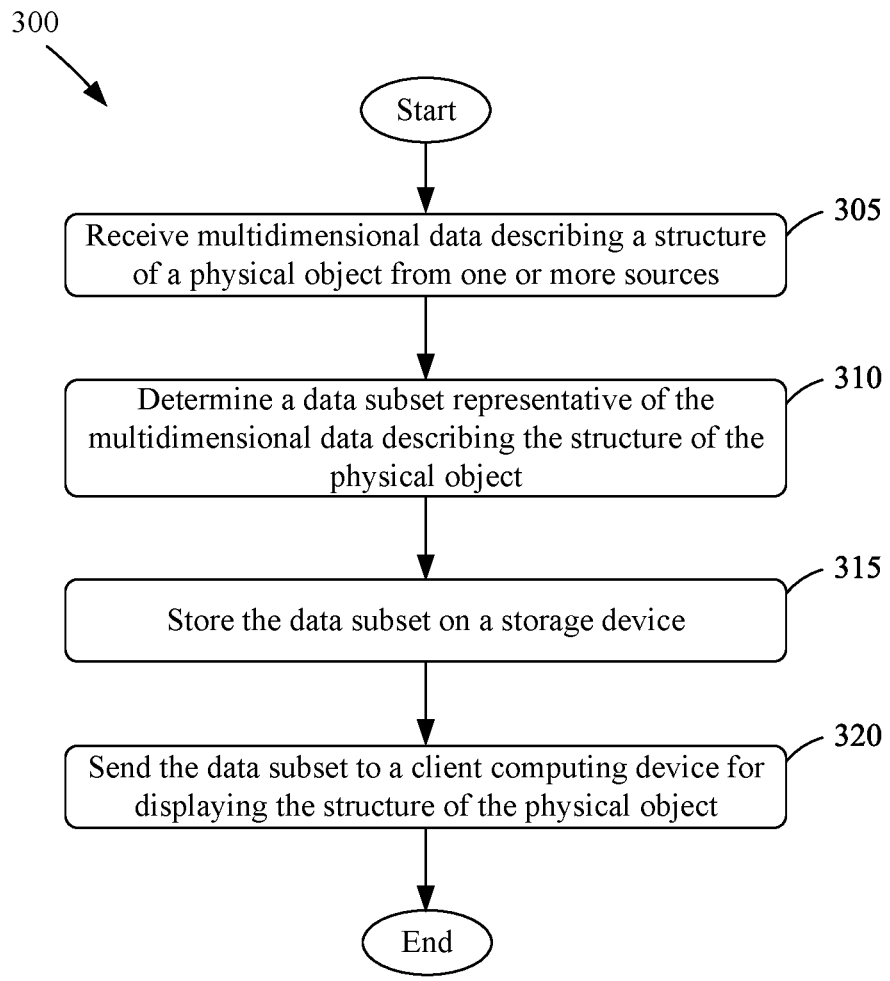
FIG. 3 illustrates a flow diagram of an example process for facilitating making partial selections of multidimensional information while maintaining a multidimensional structure, according to an example embodiment.

FIG. 3 illustrates a flow diagram of an example process 300 for facilitating making partial selections of multidimensional information while maintaining a multidimensional structure, according to an example embodiment. In certain embodiments, the operations of the example process 300 may be performed by a server computing device, such as the server computing device 105 illustrated in FIG. 1. The process 300 may begin at block 305.

At block 305, the data randomization module 156 (executing on the server computing device 105) may receive multidimensional data describing a structure of a physical object (such as the object 102 of FIG. 1) from one or more sources. For example, the data randomization module may receive the multidimensional data 135 from the data source 130 as shown in FIG. 2. In some embodiments, the multidimensional data 135 may include three-dimensional data describing and/or representing the object 102. In some embodiments, the multidimensional data 135 may be received as a file from multiple sources (e.g., a LiDAR data source, an image-derived point cloud data source, a thermal imaging data source, etc.). In other embodiments, the multidimensional data 135 may be received as multiple data sets (in multiple files) from multiple data sources. In some embodiments, the multidimensional data 135 may include LiDAR sensor data, image-derived point cloud data, and/or data scans. In some embodiments, the multidimensional data 135 may include a large number of data points (e.g., on the order of millions or billions of data points) utilized to describe the object 102.

At block 310, the data randomization module 156 may determine a data subset (e.g., the data subset 145 of FIGS. 1 and 2) representative of the multidimensional data describing the structure of the physical object that was received at block 305. For example, the data randomization module 156 may randomize or shuffle the multidimensional data 135 to generate a data subset 145 including sample data that is smaller in size (e.g., thousands of data points) than the multidimensional data 135 (which may contain millions or billions of data points). In some embodiments, the data randomization module 156 may randomize or shuffle the multidimensional data 135 by removing a temporal bias and/or a computational bias present in the multidimensional data 135. In some embodiments, the data randomization module 156 may utilize a shuffle algorithm to randomize the multidimensional data 135. In some embodiments, where the multidimensional data 135 includes an extremely large amount of data (e.g., billions of data points), the data randomization module 156 may utilize or shuffle the multidimensional data 135 across multiple distributed computing systems simultaneously.

At block 315, the data randomization module 156 may store the data subset 145 determined at block 310 on a storage device. For example, the data randomization module 156 may instruct the server computing device 105 to store the data subset 145 (including the randomized data) on the data storage device 140. In some embodiments, the data storage device 140 may include one or more cloud storage devices. Thus, in some examples, the data subset 145 may be stored as a file (or files) on the one or more cloud storage devices.

At block 320, the data randomization module 156 may send the data subset 145 stored at block 315 to a client computing device for displaying the structure of the physical object. For example, in some embodiments, the data randomization module 156 may instruct the server computing device 105 to request that data storage device 140 send the data subset 145 to the client computing device 110 of FIG. 1. In some embodiments, the data randomization module 156 may instruct the server computing device 105 to retrieve the data subset 145 from the data storage device 140 and then send the data subset 145 to the client computing device 110. In some embodiments, the client computing device 110 may request the data subset 145 (from either the server computing device 105 and/or the data storage device 140), prior to the data subset 145 being sent. Upon receiving the data subset 145, the client computing device 110 may execute a data processing/display module (e.g., the data processing/display module 167 of FIG. 1) to process and display the randomized data in the data subset 145. For example, the data processing/display module 167 may be configured to display the randomized data in the data subset 145 as a three-dimensional image of the object 102 in a web browser on a display screen of the client computing device 110. The display of the randomized data in the data subset 145 on the client computing device 110 may represent a partial selection (e.g., a subset of the multidimensional data 135) that accurately represents a three-dimensional object while maintaining the original structure of the object 102 and in accordance with available memory, processing, and bandwidth constraints associated with the client computing device 110.

Thus, the smaller size of the data subset 145 may enable the client computing device 110 to utilize fewer hardware computing processing, memory, and bandwidth to display the structure of the object 102 than are associated with displaying the object 102 using the multidimensional data 135 when the client computing device 110 would otherwise be incapable of displaying the multidimensional data 135. For example, in accordance with the embodiments described herein, a large three-dimensional data file describing an object (such as a land mass) may easily exceed the memory and storage limitations of a handheld computing device and further take up to several hours to communicate over a 1 GB Internet connection (or even longer over slower connections). By applying the embodiments described herein, a randomized or sample data file accurately describing the land mass may be generated such that it may be stored on the same handheld computing device and further communicated over the aforementioned Internet connection in a matter of minutes due to having a smaller file size.

The process 300 may end following block 320.

Various embodiments of the invention are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, in some embodiments.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

The computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. The computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments may provide for a computer program product, comprising a computer-readable medium having a computer-readable program code or program instructions embodied therein, said computer-readable program code adapted to be executed to implement one or more functions specified in the flow diagram block or blocks. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for making partial selections of multidimensional information while maintaining a multidimensional structure, the system comprising:
   at least one processor; and
   at least one memory storing computer-executable instructions that when executed by the at least one processor, cause the system to:
      receive, by a server computing device, multidimensional data describing a structure of a physical object from one or more sources, wherein the one or more sources comprises a Light Detection and Ranging (LiDAR) data source;
      determine, by the server computing device, a data subset representative of the multidimensional data describing the structure of the physical object, wherein the data subset is determined by randomizing the multidimensional data to generate sample data that is smaller in size than the multidimensional data, wherein randomizing the multidimensional data comprises removing a temporal bias and a computational bias present in the multidimensional data, wherein the temporal bias and the computational bias comprise a statistical measure representing a recording of spatial information in the data set to a storage device over a plurality of time periods such that data points in the data set are spatially clustered leading to inaccuracies in the described structure of the physical object;
      store, by the server computing device, the data subset on the storage device; and
      send, by the server computing device, the data subset to a client computing device for displaying the structure of the physical object, wherein the data subset enables the client computing device to utilize fewer hardware computing processing, memory, and network bandwidth to display the structure of the physical object than are associated with displaying the physical object using the multidimensional data, wherein the client computing device is incapable of displaying the multidimensional data.

2. The system of claim 1, wherein the multidimensional data is received as a plurality of separate data sets.

3. The system of claim 1, wherein the multidimensional data comprises image data representing the physical object in three-dimensions.

4. The system of claim 1, wherein the data subset is stored as a file on the storage device, the storage device comprising one or more cloud storage devices.

5. The system of claim 1, wherein the data subset is sent in response to a request by the client computing device to receive a partial selection of the multidimensional data.

6. The system of claim 1, wherein the data subset maintains an original structure of the physical object.

7. A computer-implemented method for making partial selections of multidimensional information while maintaining a multidimensional structure, at least a portion of the method being performed by a server computing device comprising at least one processor, the method comprising:
   receiving, by the server computing device, multidimensional data describing a structure of a physical object from one or more sources, wherein the one or more sources comprises a Light Detection and Ranging (LiDAR) data source;
   determining, by the server computing device, a data subset representative of the multidimensional data describing the structure of the physical object, wherein determining the data subset comprises randomizing the multidimensional data to generate sample data that is smaller in size than the multidimensional data, wherein randomizing the multidimensional data comprises removing a temporal bias and a computational bias present in the multidimensional data, wherein the temporal bias and the computational bias comprise a statistical measure representing a recording of spatial information in the data set to a storage device over a plurality of time periods such that data points in the data set are spatially clustered leading to inaccuracies in the described structure of the physical object;
   storing, by the server computing device, the data subset on the storage device; and
   sending, by the server computing device, the data subset to a client computing device for displaying the structure of the physical object, wherein the data subset enables the client computing device to utilize fewer hardware computing processing, memory, and network bandwidth to display the structure of the physical object than are associated with displaying the physical object using the multidimensional data, wherein the client computing device is incapable of displaying the multidimensional data.

8. The computer-implemented method of claim 7, wherein the multidimensional data is received as a plurality of separate data sets.

9. The computer-implemented method of claim 7, wherein the multidimensional data comprises image data representing the physical object in three-dimensions.

10. The computer-implemented method of claim 7, wherein the data subset is stored as a file on the storage device, the storage device comprising one or more cloud storage devices.

11. The computer-implemented method of claim 7, wherein the data subset is sent in response to a request by the client computing device to receive a partial selection of the multidimensional data.

12. The computer-implemented method of claim 7, wherein the data subset maintains an original structure of the physical object.

13. A non-transitory computer-readable medium comprising one or more computer-readable instructions that, when executed by at least one processor of a server computing device, cause the server computing device to:
   receive, multidimensional data describing a structure of a physical object from one or more sources, wherein the one or more sources comprises a Light Detection and Ranging (LiDAR) data source;
   determine a data subset representative of the multidimensional data describing the structure of the physical object, wherein the data subset is determined by randomizing the multidimensional data to generate sample data that is smaller in size than the multidimensional data, wherein randomizing the multidimensional data comprises removing a temporal bias and a computational bias present in the multidimensional data, wherein the temporal bias and the computational bias comprise a statistical measure representing a recording of spatial information in the data set to a storage device over a plurality of time periods such that data points in the data set are spatially clustered leading to inaccuracies in the described structure of the physical object;

store the data subset on the storage device; and send the data subset to a client computing device for displaying the structure of the physical object, wherein the data subset enables the client computing device to utilize fewer hardware computing processing, memory, and network bandwidth to display the structure of the physical object than are associated with displaying the physical object using the multidimensional data, wherein the client computing device is incapable of displaying the multidimensional data.

14. The non-transitory computer-readable medium of claim 13, wherein the multidimensional data is received as a plurality of separate data sets.

* * * * *